(12) United States Patent
Swann et al.

(10) Patent No.: US 11,739,700 B2
(45) Date of Patent: Aug. 29, 2023

(54) AIRCRAFT PROPULSION SYSTEM WITH HYDROCARBON AND HYDROGEN FUEL ADAPTION FOR REDUCED CONDENSATION TRAIL IMPACT

(71) Applicant: ROLLS-ROYCE plc, London (GB)

(72) Inventors: Peter Swann, Derby (GB); Jonathan E Holt, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 17/697,761

(22) Filed: Mar. 17, 2022

(65) Prior Publication Data

US 2022/0316410 A1 Oct. 6, 2022

(30) Foreign Application Priority Data

Mar. 30, 2021 (GB) .................................... 2104469

(51) Int. Cl.
*F02C 9/28* (2006.01)
*A01G 15/00* (2006.01)
(Continued)

(52) U.S. Cl.
CPC ................ *F02C 9/28* (2013.01); *A01G 15/00* (2013.01); *B64D 27/16* (2013.01); *B64D 31/00* (2013.01);
(Continued)

(58) Field of Classification Search
CPC .. B64D 27/16; B64D 2027/026; B64D 37/00; B64D 37/30; F02C 3/22; F02C 9/28; F02C 9/40; A01G 15/00
See application file for complete search history.

(56) References Cited

U.S. PATENT DOCUMENTS 9,309,811 B2 * 4/2016 Swann ...................... F02C 9/40
9,650,968 B2 * 5/2017 Swann ...................... F02C 9/28
(Continued)

FOREIGN PATENT DOCUMENTS

WO 2020/079419 A1 4/2020

OTHER PUBLICATIONS

Jul. 12, 2022 Extended European Search Report issued in European Patent Application No. 22 16 2095.8.
(Continued)

*Primary Examiner* — Alain Chau
(74) *Attorney, Agent, or Firm* — Oliff PLC

(57) ABSTRACT

An aircraft propulsion system includes a hydrocarbon fuel store, a hydrogen fuel store, an engine system capable of producing thrust by combusting hydrocarbon fuel and/or combusting or oxidising hydrogen fuel, a conveying system to convey hydrocarbon and hydrogen fuel from the fuel stores to the engine system and a control system to control the respective flow rates of the fuel within the conveying system. The control system adapts the fractions of the total fuel energy flow rate to the engine system represented by the hydrocarbon and hydrogen fuel energy flow rates in order to reduce climate warming impact caused by at least one of carbon dioxide, water vapour and condensation trails and/or increase climate cooling impact caused by condensation trails produced by the aircraft propulsion system compared to a dual-fuel propulsion system in which a reserve of hydrocarbon fuel is entirely combusted before any of a reserve of hydrogen fuel.

19 Claims, 2 Drawing Sheets

(51) Int. Cl.
    *B64D 31/00*     (2006.01)
    *B64D 37/30*     (2006.01)
    *F02C 3/22*     (2006.01)
    *F02C 9/40*     (2006.01)
    *B64D 27/16*     (2006.01)

(52) U.S. Cl.
    CPC ............. *B64D 37/30* (2013.01); *F02C 3/22* (2013.01); *F02C 9/40* (2013.01)

(56) References Cited

U.S. PATENT DOCUMENTS

| | | | | |
|---|---|---|---|---|
| 2010/0162678 A1* | 7/2010 | Annigeri | ................... | F02C 3/22 60/39.463 |
| 2013/0340834 A1* | 12/2013 | Swann | ...................... | F02C 9/40 702/50 |
| 2013/0343958 A1* | 12/2013 | Swann | ...................... | F02C 9/28 422/111 |
| 2015/0100219 A1* | 4/2015 | Swann | ...................... | F02C 3/20 701/100 |
| 2015/0100220 A1* | 4/2015 | Swann | ...................... | F02C 9/28 701/100 |
| 2015/0284103 A1* | 10/2015 | Swann | ...................... | F02C 9/42 701/3 |
| 2016/0146117 A1 | 5/2016 | Swann | | |
| 2018/0178920 A1* | 6/2018 | Swann | ...................... | F02K 5/00 |
| 2022/0009648 A1* | 1/2022 | Clarke | .................. | B64D 37/04 |

OTHER PUBLICATIONS

Lee et al., "The contribution of global aviation to anthropogenic climate forcing for 2000 to 2018," Atmospheric Environment, 2021, vol. 244, 117834, pp. 1-29.

Nojoumi et al., "Greenhouse gas emissions assessment of hydrogen and kerosene-fueled aircraft propulsion," International Journal of Hydrogen Energy, 2009, vol. 34, pp. 1363-1369.

Jan. 10, 2022 Search and Examination Report issued in British Patent Application No. 2104469.8.

* cited by examiner

AIRCRAFT PROPULSION SYSTEM WITH HYDROCARBON AND HYDROGEN FUEL ADAPTION FOR REDUCED CONDENSATION TRAIL IMPACT

CROSS-REFERENCE TO RELATED APPLICATIONS

This specification is based upon and claims the benefit of priority from UK Patent Application Number 2104469.8 filed on 30 Mar. 2021, the entire contents of which are incorporated herein by reference.

BACKGROUND

Field of the Disclosure

The invention relates to aircraft propulsion systems.

Description of the Related Art

Aircraft utilising hydrogen as a fuel, whether by combustion and/or oxidation within a fuel cell, are of interest because they do not produce carbon dioxide during operation. However, aircraft fueled only by hydrogen are severely constrained in terms of range because although hydrogen itself has a high specific energy, it requires large, heavy tanks which add weight and constrain airframe design. Dual-fuel aircraft have therefore been proposed which use both hydrogen fuel and hydrocarbon fuel (typically kerosene) in order to allow the range of an aircraft to be extended beyond that achievable using hydrogen fuel alone. In order to maximise the range of such an aircraft, the fuel of lower specific energy, i.e. hydrocarbon, is consumed first, followed by consumption of hydrogen. For flights not requiring a long range, an aircraft may run entirely or mostly on hydrogen. However, although an aircraft which runs on hydrogen for the whole or part of a flight mission produces less carbon dioxide than an equivalent conventional aircraft, there may be an overall climate warming impact for the whole or that part of the flight mission fueled by hydrogen as a result of water vapour emissions and/or condensation trails produced by the aircraft. If a dual-fuel aircraft carries out a first part of a flight mission using hydrocarbon fuel and a second part using hydrogen fuel, a climate warming impact for the first part may result from carbon dioxide, water vapour and contrails produced by the aircraft during the first part of the flight mission, and a climate warming impact for the second part may result from water vapour emissions and contrails produced by the aircraft during the second part of the flight mission. Although use of hydrogen fuel results in a reduction in carbon dioxide emissions at the point of use, a dual-fuel aircraft may still have an overall climate warming impact, and a climate warming impact may result even for a part of a flight mission fueled by hydrogen alone.

SUMMARY

According to a first aspect of the present invention, an aircraft propulsion system comprises:
- a hydrocarbon fuel store;
- a hydrogen fuel store;
- an engine system capable of producing thrust by:
  - (i) combusting hydrocarbon fuel; and/or
  - (ii) combusting or otherwise oxidising hydrogen fuel;
- a conveying system arranged to convey hydrocarbon fuel and hydrogen fuel from the fuel stores to the engine system; and
- a control system arranged to control the respective flow rates of hydrocarbon fuel and hydrogen fuel within the conveying system;

wherein the control system is arranged to adapt the fractions of the total fuel energy flow rate to the engine system represented by the hydrocarbon fuel energy flow rate and the hydrogen fuel energy flow rate in order to reduce climate warming impact caused by at least one of carbon dioxide, water vapour and condensation trails produced by the aircraft propulsion system and/or to increase climate cooling impact caused by contrails produced by the aircraft propulsion system. Net climate warming caused by an aircraft comprising the aircraft propulsion system is reduced compared to a dual-fuel aircraft in which a store of hydrocarbon fuel is entirely consumed before a store of hydrogen fuel is consumed.

The control system may be arranged to increase the fraction of the total fuel energy flow rate to the engine system represented by the hydrocarbon fuel energy flow rate and reduce the fraction of the total fuel energy flow rate to the engine system represented by the hydrogen fuel energy flow rate when the aircraft propulsion system enters air having a relative humidity over ice greater than 100%, so that the humidity in the exhaust of the aircraft propulsion system is reduced, thereby preventing condensation trail (contrail) formation in the exhaust of the system in some circumstances. The control system may be arranged to increase the fraction of the total fuel energy flow rate to the engine system represented by the hydrocarbon fuel energy flow rate and reduce the fraction of the total fuel energy flow rate to the engine system represented by the hydrogen fuel energy flow rate when the aircraft propulsion system enters air having a relative humidity over ice greater than a threshold value, such as 120% or 130% for example, so that the humidity in the exhaust of the aircraft propulsion system is reduced only when ice particles within a contrail are likely to survive interaction with a wingtip vortex produced by an aircraft comprising the aircraft propulsion system.

The control system may be arranged to reduce the fraction of the total fuel energy flow rate to the engine system represented by the hydrocarbon fuel energy flow rate and increase the fraction of the total fuel energy flow rate represented by the hydrogen fuel energy flow rate when the system enters air having a relative humidity over ice greater than 100%.

The control system may be arranged to increase the fraction of the total fuel energy flow rate to the engine system represented by the hydrocarbon fuel energy flow rate and reduce the fraction of the total fuel energy flow rate to the engine system represented by the hydrogen fuel energy flow rate when the aircraft propulsion system enters air having a relative humidity over ice greater than 100% under conditions in which a condensation trail reduces climate warming impact, such that the optical depth and/or lifetime of a contrail (condensation trail) produced by the aircraft propulsion system is/are increased under such conditions.

The control system may be arranged to vary the fractions of the total fuel energy flow rate to the engine system represented by the hydrocarbon fuel energy flow rate and the hydrogen fuel energy flow rate as a function of one or more of the latitude, longitude and altitude of the aircraft propulsion system.

The control system may be arranged to increase the fraction of the total fuel energy flow rate to the engine system represented by the hydrocarbon fuel energy flow rate and reduce the fraction of the total fuel energy flow rate to the engine system represented by the hydrogen fuel energy flow rate when the altitude of the aircraft propulsion system exceeds a threshold altitude, thus providing for water vapour emissions of the aircraft propulsion system to be reduced at altitudes greater than the threshold altitude. The control system may be arranged to increase the fraction of the total fuel energy flow rate to the engine system represented by the hydrocarbon fuel energy flow rate and reduce the fraction of the total fuel energy flow rate to the engine system represented by the hydrogen fuel energy flow rate when the altitude of the aircraft propulsion system exceeds a threshold value such that the fraction of the total fuel energy flow rate to the engine system represented by the hydrocarbon fuel energy flow rate is a monotonically increasing function of the altitude of the aircraft propulsion system.

The control system may be arranged to increase the fraction of the total fuel energy flow rate to the engine system represented by the hydrogen fuel energy flow rate and reduce the fraction of the total fuel energy flow rate to the engine system represented by the hydrocarbon fuel energy flow rate when the aircraft propulsion system enters ice supersaturated air having conditions corresponding to the upper tropical troposphere. The control system may be arranged to reduce the fraction of the total fuel energy flow rate to the engine system represented by the hydrocarbon fuel energy flow rate to zero when the aircraft propulsion system enters ice-supersaturated air having conditions corresponding to the upper tropical troposphere and a temperature below a threshold temperature.

The control system may be arranged to adjust the fractions of the total fuel energy flow rate to the engine system represented by the hydrocarbon fuel energy flow rate and the hydrogen fuel energy flow rate such that only hydrocarbon fuel is provided to the engine system when the system operates in non-ice supersaturated air having conditions corresponding to the upper tropical troposphere in order to minimise high-altitude water vapour emissions.

The control system may be arranged to:
(i) calculate the flow rate of hydrogen fuel to the engine system necessary to generate a given total output power of the engine system for each of a series of values of the flow rate of hydrocarbon fuel to the engine system and a given set of atmospheric conditions and a given aircraft velocity;
(ii) for each calculated value of the flow rate of hydrocarbon fuel and a corresponding value of the flow rate of hydrogen fuel to the engine system, calculate a climate impact value for the climate effects of $CO_2$, water vapour and direct condensation trail effects per unit time or per unit flight distance for a given set of atmospheric conditions and a given aircraft velocity;
(iii) determine the pair of fuel flow rates of hydrocarbon fuel and hydrogen fuel resulting in the lowest climate impact value for the set of atmospheric conditions and aircraft velocity; and
(iv) control the respective flow rates of hydrocarbon fuel and hydrogen fuel to the engine system to implement the pair of fuel flow rates determined in step (iii).

The control system may be arranged to calculate climate impact values by steps including calculating the masses of $CO_2$ and water vapour, and the number of soot particles, emitted per unit time or flight distance in dependence upon aircraft forward velocity, the respective flow rates of hydrocarbon fuel and hydrogen fuel to the engine system, the $CO_2$ emission index of the hydrocarbon fuel, the water vapour emission indices of the hydrocarbon fuel and the hydrogen fuel and optionally characteristics of the engine system. The control system may be arranged to calculate climate impact values by steps including calculating or looking up the climate impact per unit mass of water vapour emitted by the aircraft propulsion system as a function of at least one of altitude, latitude and longitude of the aircraft propulsion system. The control system may be arranged to calculate climate impact values by steps including calculating the climate impact per unit time or flight distance of $CO_2$ emitted by the aircraft propulsion system.

The control system may be arranged to calculate climate impact values by steps including calculating the climate impact per unit time or flight distance of a condensation trail corresponding to determined water vapour and soot emissions which correspond to given flow rates of hydrocarbon fuel and hydrogen fuel to the engine system.

The control system may carry out steps (i) to (iv) either continuously or for each of a plurality of flight path sections each of which is defined by flight time or flight distance or on the basis of a material change in at least one of the altitude, latitude and longitude of the aircraft propulsion system, ambient static temperature, ambient relative humidity, aircraft Mach number and required total output power of the engine system.

The hydrogen fuel store may comprise a plurality of separate hydrogen fuel stores, one or more of which is selectably removeable from the aircraft propulsion system to allow adaptation of the storage capacity of the hydrogen fuel store.

A second aspect of the invention provides an aircraft comprising an aircraft propulsion system according to the first aspect of the invention.

A third aspect of the present invention provides a method of operating an aircraft propulsion system which comprises:
a hydrocarbon fuel store;
a hydrogen fuel store;
an engine system capable of producing thrust by:
(i) combusting hydrocarbon fuel; and/or
(ii) combusting or otherwise oxidising hydrogen fuel; and
a conveying system arranged to convey hydrocarbon fuel and hydrogen fuel from the fuel stores to the engine system;
the method comprising the step of controlling the respective flow rates of hydrocarbon fuel and hydrogen fuel within the conveying system to adapt the fractions of the total fuel energy flow rate to the engine system represented by the hydrocarbon fuel energy flow rate and the hydrogen fuel energy flow rate in order to reduce climate warming impact caused by at least one of carbon dioxide, water vapour and condensation trails produced by the aircraft propulsion system and/or to increase climate cooling impact caused by condensation trails produced by the aircraft propulsion system.

The step of controlling the respective flow rates of hydrocarbon fuel and hydrogen fuel within the conveying system may comprise increasing the fraction of the total fuel energy flow rate to the engine system represented by the hydrocarbon fuel energy flow rate and reducing the fraction of the total fuel energy flow rate to the engine system represented by the hydrogen fuel energy flow rate when the aircraft propulsion system enters air having a relative humidity over ice greater than 100%. The step of controlling the respective flow rates of hydrocarbon fuel and hydrogen fuel within the conveying system comprises increasing the fraction of the total fuel energy flow rate to the engine system represented by the hydrocarbon fuel energy flow rate and reducing the fraction of the total fuel energy flow rate to the engine system represented by the hydrogen fuel energy flow rate when the aircraft propulsion system enters air having a relative humidity over ice greater than 120%, or greater than 130%.

The step of controlling the respective flow rates of hydrocarbon fuel and hydrogen fuel within the conveying system comprises reducing the fraction of the total fuel energy flow rate to the engine system represented by the hydrocarbon fuel energy flow rate and increasing the fraction of the total fuel energy flow rate to the engine system represented by the hydrogen fuel energy flow rate when the aircraft propulsion system enters air having a relative humidity over ice greater than 100%.

The step of controlling the respective flow rates of hydrocarbon fuel and hydrogen fuel within the conveying system comprises increasing the fraction of the total fuel energy flow rate to the engine system represented by the hydrocarbon fuel energy flow rate and reducing the fraction of the total fuel energy flow rate to the engine system represented by the hydrogen fuel energy flow rate when the aircraft propulsion system enters air having a relative humidity over ice greater than 100% under conditions in which a condensation trail reduces climate warming impact.

The step of controlling the respective flow rates of hydrocarbon fuel and hydrogen fuel within the conveying system comprises increasing the fraction of the total fuel energy flow rate to the engine system represented by the hydrocarbon fuel energy flow rate and reducing the fraction of the total fuel energy flow rate to the engine system represented by the hydrogen fuel energy flow rate when the altitude of the aircraft propulsion system exceeds a threshold altitude.

BRIEF DESCRIPTION OF THE DRAWINGS

Embodiments of the invention are described below by way of example only and with reference to the accompanying drawings in which.

DETAILED DESCRIPTION OF THE DISCLOSURE

Figure 1:
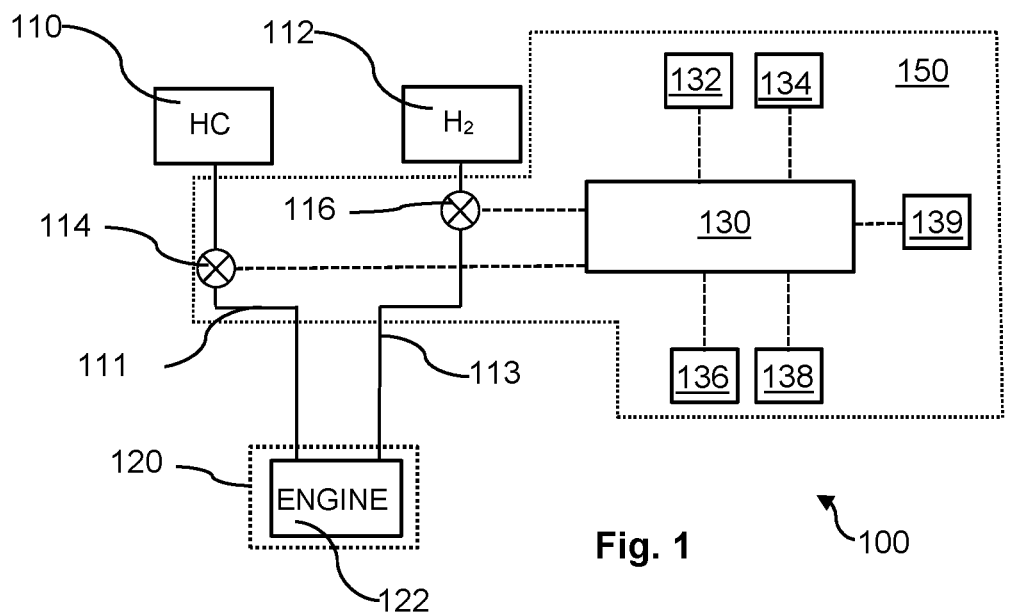
FIGS. 1 to 4 show first to fourth example aircraft propulsion systems of the invention.

Although hydrogen combustion does not produce carbon dioxide, burning hydrogen produces substantially more water vapour per unit of fuel energy than burning a hydrocarbon. For example, hydrogen has a specific energy of 120 MJ/kg and produces approximately 75 g of water vapour per MJ of fuel energy when burned or oxidised, whereas kerosene has a specific energy of approximately 42.8 MJ/kg and produces approximately 29.4 g of water vapour per MJ of fuel energy when burned or oxidised. Water vapour in the atmosphere can result in a significant climate warming impact depending on the altitude at which it is produced. Broadly speaking, the higher the altitude at which water vapour is emitted by an aircraft, the greater is its climate warming effect. For altitudes typically used at present by commercial air traffic, radiative forcing (RF) and/or effective radiative forcing (ERF) per kg of emitted water vapour is modest. However, as altitude increases further, RF and/or ERF per kg becomes much more substantial.

Condensation trails, also known as contrails, are line-shaped ice clouds which form in the exhaust plumes of aircraft under certain circumstances. Contrails can exert a climate warming effect by trapping upwelling infrared radiation which would otherwise escape into space, and a climate cooling effect by reflecting back into space sunlight which would otherwise reach the surface. Averaged over aviation as a whole, and based on 2019 aviation patterns, the net effect is warming. Once formed, contrail ice particles can survive for many hours if the ambient air is ice supersaturated (ISS). During this time a contrail can spread to resemble natural cirrus cloud. Alternatively, in non-ISS ambient air, contrail ice particles quickly lose ice mass via sublimation and disappear within typically a few tens of seconds. Irrespective of the lifetime of a contrail ice-particle, its demise releases back into the atmosphere as vapour the mass of water originally used to create it, some of which may have originated from water vapour emitted by an aircraft, and some of which may have originated from ambient water vapour. Once released from the ice particles, that water vapour may exert a climate warming impact in its own right.

The optical depth of a region is a measure of how much electromagnetic radiation, optionally in certain wavelength ranges, is prevented from travelling through the region. In the case of a contrail or ice cloud, optical depth is influenced primarily by ice particle number density, effective ice particle radius, and the physical thickness of the contrail or ice cloud. Since most contrails are optically thin their radiative forcing is approximately proportional to their optical depth.

The high value of water vapour emissions per unit of fuel energy for hydrogen means that a hydrogen-fuelled aircraft has the potential, depending on the presence of suitable condensation nuclei, to produce contrails over a wider range of atmospheric conditions than a hydrocarbon-fuelled aircraft, since the relative humidity in a young exhaust plume of a hydrogen-fuelled aircraft is greater than that in a young exhaust plume of a hydrocarbon-fuelled aircraft. However, burning hydrogen typically produces far fewer exhaust pollutants than burning hydrocarbon. As a result, the number of potential condensation nuclei available for forming contrail ice particles is substantially reduced, potentially leading to contrails with far fewer ice particles and hence a lower climate impact per unit length of formed contrail.

For a hydrocarbon-fuelled aircraft, the extent of RF (or ERF) produced by contrails and contrail cirrus produced by the aircraft depends on ambient atmospheric conditions which in general vary with altitude and latitude. At low altitudes, the climate impact of contrails is minimal due either to a lack of contrail formation or due to short contrail lifetime. At very high altitudes, contrail formation is not possible. At intermediate altitudes there is a strong variation in RF with latitude. One particular region, the upper tropical troposphere (UTT), has the potential for very high contrail climate impact per kilometre of aircraft distance flown.

Within the UTT, ambient temperatures are frequently very low, the air is frequently supersaturated with respect to ice, and even though the relative humidity is high, the absolute humidity is extremely low. Therefore, within the UTT:
  (a) contrail formation is almost inevitable, regardless of whether an aircraft is burning hydrogen or hydrocarbon;
  (b) frequent occurrence of ISS air means that a large proportion of formed contrail will persist, and/or that choosing routes or altitude profiles to avoid ISS air may not be feasible or cost effective;
  (c) very low absolute humidity leads to low growth rates of contrail ice crystals, leading to long contrail lifetimes, perhaps days rather than hours, hence:

(i) a contrail obscures the sky for correspondingly longer than a conventional contrail would at each stage of its lifecycle, thus it can exert a greater cooling or warming effect; and (ii) long contrail lifetime makes it less feasible to restrict the lifetime of an individual contrail to primarily the daylight hours by flying at a particular time of day; there is therefore less possibility for a contrail to achieve a net cooling effect over its lifetime;

(d) due to the very low ambient temperatures in the UTT, re-radiation by ice crystals of trapped heat will be very low, i.e. retention of upwelling heat from below will be very effective (by Stefan's Law, the power radiated by a black body is proportional to the fourth power of the body's absolute temperature); and (e) due to the typically high surface temperatures at low latitude, there will be significant upwelling flux of heat to trap.

Since combusting hydrogen typically produces more water vapour but fewer condensation nuclei than combusting a hydrocarbon, in general it is advantageous to combust only hydrogen fuel during certain parts of a flight mission, hydrocarbon fuel only in other parts and some combination of hydrocarbon fuel and hydrogen fuel in still further parts in order to minimise or mitigate the overall total RF and/or ERF caused by water vapour, contrails and carbon dioxide generated by the flight mission. Thus, in accordance with the invention, in a dual-fuel (i.e. hydrocarbon and hydrogen) aircraft, the total fuel energy flow rate $\dot{E}$ to an engine system of the aircraft is in general made up of a hydrocarbon fuel energy flow rate $\dot{E}_{HC}$ and a hydrogen fuel energy flow rate $\dot{E}_{H2}$, i.e.

$$\dot{E}=\dot{E}_{HC}+\dot{E}_{H2}$$

with fractions x, 1−x of the total fuel energy flow rate E being represented by the hydrocarbon and hydrogen fuel energy flow rates respectively, i.e.

$$\dot{E}_{HC}=x\dot{E}=W_{HC}s_{HC} \text{ and } \dot{E}_{H2}=(1-x)\dot{E}=W_{H2}s_{H2},$$

where W represents the flow rate (mass or volume per unit time) of a fuel and s represents the energy per unit mass or per unit volume of a fuel. The fraction x is adapted according to prevailing ambient atmospheric conditions, or proxies for such conditions such as altitude and latitude, and flight conditions such as thrust demand (or more generally the required total output power of the engine system) and aircraft forward velocity, in order to mitigate total RF and/or ERF (or in general climate warming impact) caused by the aircraft. In the case of a prior-art dual-fuel aircraft, only hydrocarbon is burned during a first portion of a flight mission and only hydrogen is burned subsequently. In accordance with the present invention, a portion of the initial mass of hydrocarbon fuel in a dual-fuel aircraft is held in reserve, rather than the aircraft's entire store of hydrocarbon being completely exhausted, so that the fraction x may be varied between zero and unity during any part of a flight mission, rather than only during the first portion of the flight mission. In the case of an aircraft which can in principle be powered solely by hydrogen, a relatively small store of hydrocarbon fuel may be carried on board, so that hydrocarbon or a combination of hydrocarbon and hydrogen may be combusted during parts of a flight mission in order to reduce total RF and/or ERF (or more generally climate warming impact) caused by the flight mission. Such an aircraft requires an engine system capable of utilising hydrocarbon fuel, and a combination of hydrocarbon fuel and hydrogen fuel, as well as hydrogen fuel alone.

FIG. 1 shows a first example aircraft propulsion system 100 of the invention, the system 100 comprising a fuel tank 110 storing hydrocarbon fuel, a fuel tank 112 storing hydrogen fuel, an engine system 120 consisting of a single turbofan engine 122, and a conveying system comprising fuel ducts 111, 113 for conducting fuel from fuel tanks 110, 112 respectively to the turbofan engine 122. Fuel duct 111 includes a valve 114 for adjusting the flow rate $W_{HC}$ of hydrocarbon fuel from the tank 110 to the turbofan engine 122 during operation of the system 100 and hence the hydrocarbon fuel energy flow rate to the turbofan engine 122. Fuel duct 113 includes a valve 116 for adjusting the flow rate $W_{H2}$ of hydrogen fuel from the tank 112 to the turbofan engine 122 and hence the hydrogen fuel energy flow rate to the turbofan engine 122. Mechanical power may be extracted from one or more spools of the turbofan engine 122 to drive auxiliary systems of the aircraft, for example via an auxiliary gearbox.

The fractions x, 1−x of the total fuel energy flow rate to the engine system 120 represented by the hydrocarbon fuel energy flow rate and by the hydrogen fuel energy flow rate respectively are controlled by a control system 150 comprising the valves 114, 116, which adjust the flow rates $W_{HC}$, $W_{H2}$ under control of a controller 130. The control system 150 further comprises sensors 132, 134, 136, 138, 139 which provide input data to the controller 130. Sensors 132, 134, 136 detect ambient temperature, pressure and humidity respectively of air through which an aircraft comprising the system 100 may fly. Data corresponding to thrust demand in an aircraft comprising the propulsion system 100 and the forward velocity of the aircraft is provided to the controller 130 by sensors 138, 139. Data corresponding to other, non-motive, power required from the turbofan engine 122, such as mechanical power-offtake from one or more spools of the turbofan engine 122 required for driving an auxiliary gearbox and associated systems, is also input to the controller 130. The fuel flow rates $W_{HC}$, $W_{H2}$ are adjusted depending on ambient atmospheric conditions detected by the sensors 132, 134, 136, the total power output required from the turbofan engine 122 (including thrust demand detected by sensor 138), the aircraft forward velocity detected by sensor 139 and on processing carried out by the controller 130 on the data input to it as described below.

The aircraft propulsion system 100 is a dual-fuel propulsion system for providing an aircraft comprising the system 100 with a range which is extended beyond that achievable using hydrogen fuel only stored in tank 112. In operation of the system 100, hydrocarbon fuel within the tank 110 is generally consumed first as it has a lower specific energy than hydrogen fuel (see for example US Patent Application Publication 2016/0146117). However, not all of the hydrocarbon fuel within the tank 110 is consumed prior to commencement of combustion of hydrogen fuel within the tank 112 by the turbofan engine 122; a fraction of the initial mass of hydrocarbon fuel present at the start of a flight mission is retained so that so typically the system 100 may operate throughout a flight mission fueled by hydrocarbon fuel only or hydrogen fuel only or a combination of both hydrocarbon fuel and hydrogen fuel, even though a first part of the flight mission is mostly fueled by hydrocarbon fuel and a second part mostly by hydrogen fuel.

The turbofan engine 122 may have any one of a number of different combustor arrangements for combusting hydrocarbon fuel only, hydrogen only or a combination of hydrocarbon fuel and hydrogen fuel. There may be a single annular combustor having two different burner types arranged alternately around the circumference of the combustor, or two different burner types may be arranged in two concentric rings around the circumference of a combustor. Alternatively, there may be a single annular combustor having multiple burners of a single type, each burner comprising two fuel spray nozzles or injectors, one for hydrogen fuel and one for hydrocarbon fuel. Alternatively, a canned combustor arrangement may be provided, with some cans burning hydrogen and some cans burning hydrocarbon. Another option is that the turbofan engine 122 may have two combustors in series with no turbo-machinery in between the two combustors, or there may be two combustors in series, with the second combustor lying between two distinct stages of high-pressure (HP) turbine which are mounted on the same spool as each other and which therefore have a common rotational speed. Alternatively, there may be two combustors in series, the second combustor lying between an HP turbine and an intermediate-pressure (IP) or low-pressure (LP) turbine, the two turbines not being constrained to run at the same speed as each other.

In order to avoid contrail formation during an otherwise hydrogen-burning section of a flight and in ice-supersaturated air (i.e. air having a relative humidity over ice (RHi) greater than 100%, in which a formed contrail may persist for hours rather than minutes), the propulsion system 100 switches to hydrocarbon fuel (x=1), or to a combination (i.e. 0<x<1) comprising hydrocarbon fuel and hydrogen fuel, so as to reduce the relative humidity in the engine exhaust plume of the turbofan engine 122. Thus, a persistent contrail of low optical depth (due to the small number of available condensation nuclei when burning hydrogen) is transformed into no contrail at all. If the reduction in exhaust relative humidity necessary to stop a contrail forming altogether (or to reduce its optical depth to a lower value than could be achieved with hydrogen) is greater than can be achieved by switching from hydrogen to the available hydrocarbon, the system 100 continues to combust hydrogen in the turbofan engine 122.

If the relative humidity over ice (RHi) of air through which an aircraft flies is substantially greater than 100%, for example 120% or 130%, a contrail formed by the aircraft is likely to survive interaction with a wingtip vortex produced by the aircraft, whereas a contrail formed in air with an RHi of 100% may not. A threshold RHi value, for example 120% or 130% may therefore be applied by the control system 150 such that a reduction in hydrogen fuel flow and an increase in hydrocarbon fuel flow per unit thrust is a carried out only on entering air having an RHi value greater than or equal to the threshold value.

Additionally or alternatively, when an aircraft comprising the system 100 enters a region corresponding to high RF and/or ERF per unit of water vapour emissions, for example at altitudes over 43,000 feet, the system 100 switches to hydrocarbon fuel (x=1), or to a combination or blended fuel composition (i.e. 0<x<1) comprising a higher proportion of hydrocarbon vs hydrogen (compared to the proportion on entering the region), in order to reduce the amount of water vapour released. The blend ratio (equivalently the fraction x) implemented by the controller 130 may vary with altitude, or both altitude and latitude, such that at very high altitudes the fuel composition comprises only hydrocarbon (x=1), but at progressively lower altitudes the fuel composition comprises a progressively greater proportion of hydrogen (0<x<1), subject to limits imposed by combustor operability if such limits exist.

Additionally or alternatively, when an aircraft comprising the propulsion system 100 operates in conditions where a contrail would have a mostly cooling effect (e.g. flying over ocean during the day in the absence of any underlying cloud), and where contrail formation is possible even on hydrocarbon fuel, then the controller 130 controls the valves 114, 116 such that hydrocarbon fuel only (x=1) is provided to the turbofan engine 122 for combustion, in order to enhance contrail optical depth, due to increased soot emissions generated by hydrocarbon fuel compared to hydrogen fuel.

More generally, the system 100 may operate such that a blended fuel composition (0<x<1) comprising as much hydrocarbon fuel as possible (to provide condensation nuclei) is provided to the turbofan engine 122, subject to the constraint of staying in a contrail formation condition, i.e. with at least sufficient water vapour in the exhaust to achieve condensation, and preferably in a non-threshold contrail formation condition, i.e. with at least sufficient water vapour in the exhaust of the turbofan engine 122 to achieve condensation upon a high proportion of emitted soot particles. Alternatively, the controller 130 may control the valves 114, 116 such that hydrogen only continues to be provided to the turbofan engine 122, the system 100 further comprising apparatus to intentionally create soot (or other condensation nuclei) by some other means. By targeted use in certain sections of a flight, the hydrocarbon fuel thus serves an additional purpose, beyond enabling range-extension, associated with reduction of net non-$CO_2$ climate impact, namely providing a net RF reduction by increasing the optical depth of a contrail.

If an aircraft flies in the upper tropical troposphere (UTT, a very cold region in which ice-supersaturated (ISS) air is very common and absolute humidity is very low even though relative humidity is high), long-lived contrails with high heat-trapping properties are formed. An example is an aircraft flying above the altitude of commercial traffic and at low latitude, for example between the tropics.

When an aircraft comprising the propulsion system 100 of FIG. 1 flies in ice-supersaturated (ISS) air within the UTT, the controller 130 controls the valves 114, 116 such that only hydrogen fuel is supplied to the turbofan engine 122 from the hydrogen fuel tank 110 in order to minimise contrail optical depth (i.e. x=0). However, if the available hydrogen fuel is insufficient to meet all fuel requirements in ISS air then the controller 130 operates to control the valves 114, 116 such that the available hydrogen fuel is prioritised for combustion in the coldest ambient conditions, with hydrocarbon being used in less cold but nonetheless ISS regions. Alternatively, the controller 130 controls the valves 114, 116 such that a combination of hydrogen fuel and hydrocarbon fuel is provided to the turbofan engine 122, such that the fraction x of total fuel energy flow to the turbofan engine 122 represented by hydrocarbon fuel energy flow is low enough to minimise contrail optical depth.

In the UTT, when flying in non-ISS air (corresponding to very short-lived contrails), the controller 130 operates to control the valves 114, 116 such that only hydrocarbon fuel is provided to and combusted within the turbofan engine 122, in order to minimise high-altitude water vapour emissions (x=1). If the aircraft comprising the system 100 is technically able to perform the entire flight on hydrogen i.e. without needing any hydrocarbon fuel for range-extension purposes, it may nonetheless result in a lower overall climate impact to choose hydrocarbon for such parts of a flight.

The controller 130 is programmed as follows to provide control of the fuel flows $W_{HC}$, $W_{H2}$ of hydrocarbon and hydrogen to the turbofan engine 122 in order to achieve the functionality described above.

For a given thrust requirement (or, more generally, a given total output power requirement of the turbofan engine 122) input to the controller at 138, the mass flow rate $W_{HC}$ of hydrocarbon fuel provided to the turbofan engine 122 is used as a variable parameter and a corresponding mass flow rate $W_{H2}$ of hydrogen fuel is calculated, taking into account the specific energies of the fuels $s_{HC}$, $s_{H2}$ (i.e. energies per unit mass). The variable parameter has maximum and minimum values which are dependent upon the thrust requirement and specified flight conditions.

An engine performance model calculates, for a proposed mass flow rate $W_{HC}$ of hydrocarbon fuel, the corresponding required mass flow rate $W_{H2}$ of hydrogen fuel to satisfy the engine thrust (or engine output power) requirement input to the controller 130 at 138 at prevailing flight conditions including parameters such as ambient static temperature, pressure and relative humidity, as indicated by the sensors 132, 134, 136, and the forward velocity (sensor 139) of the aircraft comprising the system 100.

An engine emissions model calculates for the same engine thrust requirement and the same flight conditions a rate of emissions per unit time, and/or per unit flight distance, of $CO_2$ mass, water vapour mass and soot particle number, in dependence upon aircraft forward speed, mass-flow rates $W_{HC}$, $W_{H2}$ of hydrocarbon and hydrogen fuels, the $CO_2$ emissions index of the hydrocarbon fuel, the water vapour emissions index of each fuel type, the composition of each fuel type and the characteristics of the one or more combustors in which fuel of each type is burned within the gas turbine engine 122.

The controller 130 stores a pre-populated lookup-table or database detailing a climate impact per unit mass of atmospheric water vapour perturbation, as a function of latitude, altitude, optionally longitude and optionally time of year, at which the perturbation takes place. Examples of water vapour perturbation include emissions of water vapour from the turbofan engine 122, removal of water vapour from the atmosphere due to incorporation into contrail ice particles, and addition of water vapour to the atmosphere due to sublimation of ice mass from contrail ice particles.

The controller 130 stores or receives weather forecast data for ambient conditions (particularly temperature, pressure, relative humidity, wind shear, up-draughts), and also solar forecast data (intensity and direction) along the expected flight route of the aircraft comprising the system 100 at the time of passing through each region along the route and for the hours following, corresponding to the potential lifetime of any contrail that may be formed by the aircraft.

A $CO_2$ impact model calculates the $CO_2$ climate impact per unit time and/or per unit flight distance in dependence upon the determined $CO_2$ emissions rate for the gas turbine engine 122 and the aircraft speed.

A water vapour impact model calculates water vapour climate impact per unit time and/or per unit flight distance in dependence upon the determined water vapour emissions rate of the turbofan engine 122, the aircraft speed and the location of emissions, using the pre-populated lookup-table or database for the climate impact of water vapour perturbation.

A further model calculates contrail lifecycle climate impact per unit time of flight and/or per unit flight distance corresponding to the determined water vapour and soot emissions at the determined engine operating point, arising from a proposed value for the mass flow rate $W_{HC}$ of hydrocarbon fuel. The calculation is performed using methods or criteria known to the skilled person, including but not necessarily limited to the Schmidt-Appleman criterion and methods described in Kärcher et al, *Nature Communications* 9 (2018), article number 1824 and Bier et al, *Journal of Geophysical Research: Atmospheres*, 124, https://doi.org/10.1029/2018JD029155.

The controller 130 may optionally run a calculation module which takes account of any indirect contrail climate impact related to the transport of water by the contrail (due to freezing, subsidence and sublimation) to lower altitudes leading to a reduction in heat retention effect and/or atmospheric residence time of the corresponding water vapour. The calculation module may make use of the pre-populated lookup-table or database for the climate impact of a water vapour perturbation, in conjunction with an assessment of the mass of water transported from each altitude band by the contrail per unit time and/or per unit flight distance, and an assessment of the altitude to which said mass of water is transported.

Optionally, a further calculation module determines a further indirect contrail climate impact arising from the effect on natural cloud formation associated with redistribution of ambient water vapour to lower altitudes (due to freezing, subsidence and sublimation). This module may also make use of the pre-populated lookup-table or database for the climate impact of a water vapour perturbation, along with details of the water transport characteristics of the contrail.

Soot particles released from contrails following sublimation of ice mass typically retain small amounts of ice in pores or cracks on their surfaces. These can predispose such soot particles to act as ice condensation nuclei at lower ambient humidity than would be possible than if the soot particles had not been processed with a contrail. It is possible that even in the absence of contrail processing, emitted soot particles might be able to act as ice nuclei in a region of very low ambient temperatures and strong updraughts such as the UTT. Hence, optionally, a further calculation module may execute on the controller 130 to determine the climate impact of changes in natural cloud formation and/or natural cloud properties arising from emitted condensation nuclei such as soot particles, taking account where appropriate of any processing within contrails of such soot particles.

The controller 130 further executes a calculation module which combines into a single value the per-unit-time and/or per-flight-distance $CO_2$ climate effects, water vapour climate effects, direct contrail climate effects, and optionally the indirect contrail climate effects and indirect natural cloud climate effects, arising from a proposed value for the mass flow rate $W_{HC}$ of hydrocarbon fuel. The single value may be based on the use of a metric such as effective radiative forcing (ERF), or adjusted global temperature change potential (AGTP), or a similar metric. The metric used may be a metric determined by the scientific community or regulatory bodies as being the most suitable metric for combining and expressing the climate effects of aviation emissions including non-$CO_2$ effects. The single value is converted into a financial cost using a pre-determined exchange rate and adds to that financial cost a further financial cost representing the cost per unit time and/or per unit flight distance of the consumed hydrocarbon fuel and hydrogen fuel.

Each flight, or optionally just the cruise phase of each flight, is broken into sections. A section can be distinguished from its neighbouring sections on the basis of flight time (e.g. a new section starts each second or each minute or every ten minutes), or on the basis of flight distance (e.g. a new section starts every mile or ten miles or 50 miles), or on the basis of a material change in any one or any combination of a number of parameters such as altitude, latitude, ambient static temperature, ambient relative humidity, aircraft Mach number and required thrust.

During each section, a computational search is carried out in the one-dimensional space spanned by allowable values of the mass flow rate $W_{HC}$ of hydrocarbon fuel. Using the above models, the value that corresponds to the lowest overall financial cost per unit time and/or per unit flight distance given the current conditions and the forecast conditions over the lifetime of any contrail that might be formed is determined. That value of mass flow rate $W_{HC}$ for the hydrocarbon fuel is implemented, and the corresponding value for the mass flow rate $W_{H2}$ of hydrogen fuel is also implemented as determined by the engine performance model, for the remaining duration of the current section. Alternatively, the mass flow rates $W_{HC}$, $W_{H2}$ are recalculated on a continuous basis.

Alternatively, in advance of a proposed flight, or in advance of any remaining sections of an in-progress flight, an optimal script may be determined, the script consisting of a sequence of fuel mass flow rates $W_{HC}$, $W_{H2}$ for the hydrocarbon and hydrogen fuels, the sequence comprising one fuel flow rate (or a pair of fuel flow rates) for each remaining section of the flight or of the cruise phase of the flight. Optimising over the whole script gives a better overall solution to the problem of mitigating climate warming impact than optimising each section in isolation and can take account of any constraints on the total amount of each fuel type available for that flight. The optimal script is used as the basis for fuel loading prior to commencement of the flight.

The propulsion system 100 may be used in an aircraft even if the aircraft is intended only to be used only for flight missions which could in principle be carried out entirely using hydrogen fuel, if the overall climate warming impact, taking into account the climate effects of $CO_2$, water vapour and contrails, is reduced by the operations described above.

In a variant of the system 100, the turbofan engine 122 is substituted by some other device or arrangement which produces thrust (propulsive power or motive power) by combusting hydrocarbon fuel and/or hydrogen fuel, and may be for example a reciprocating engine (including a propeller) or a turboprop engine (including a propeller). Another possibility is a gas turbine engine arranged to drive an electrical generator and an electric motor electrically connected to the generator and arranged to drive a propeller. The engine of the engine system may comprise an electric motor arranged to drive a shaft of the engine, such that engine has an electrical power input in addition to an input flow of chemical energy.

Figure 2:
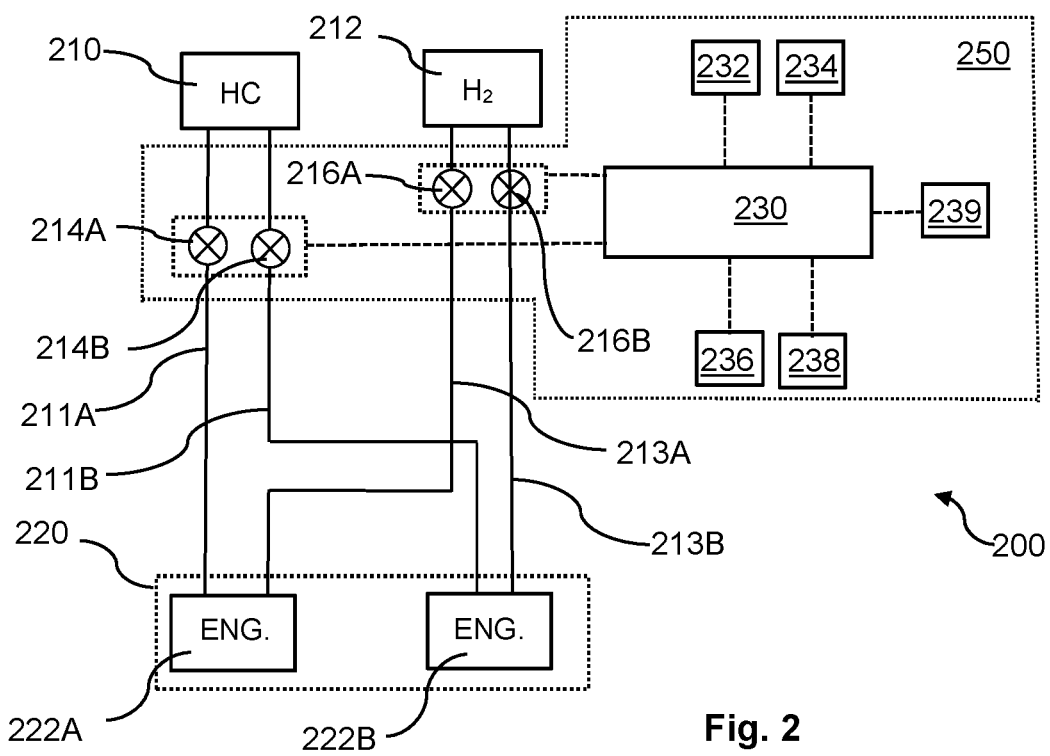
Figure 3:
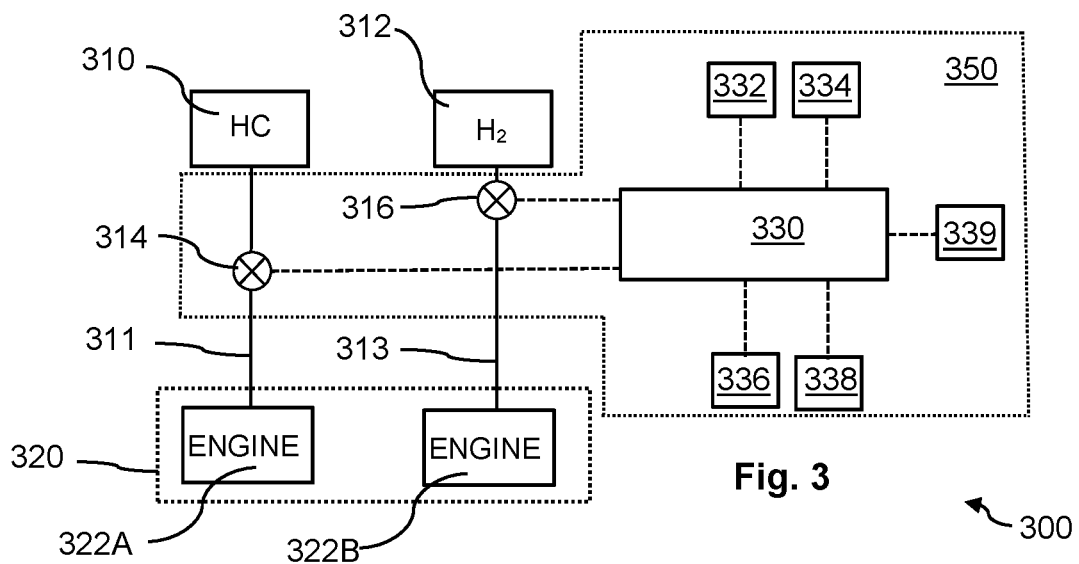
Figure 4:
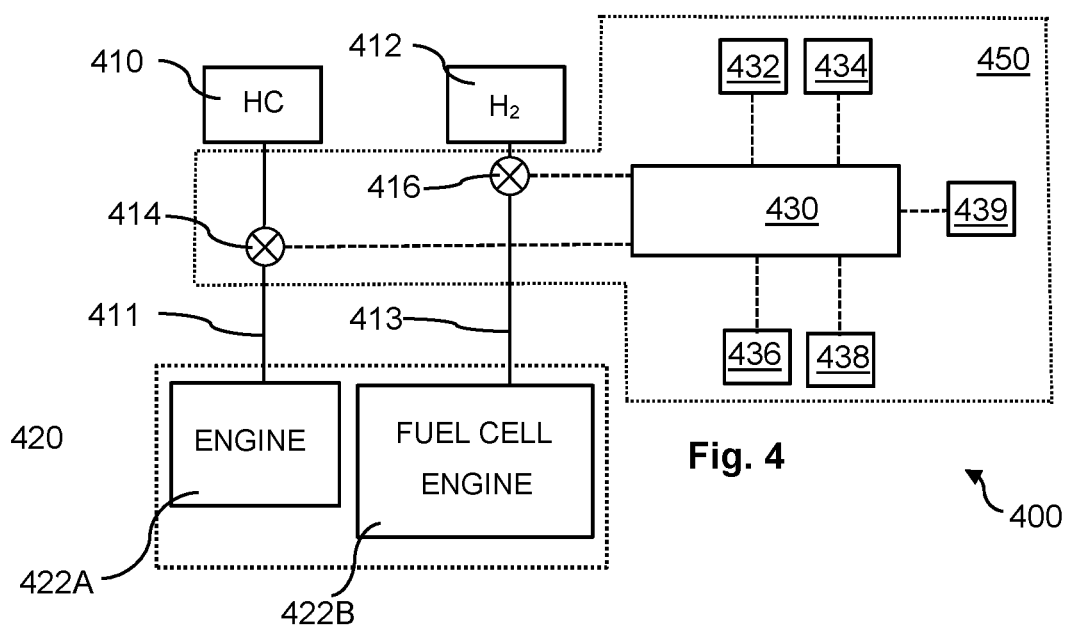

FIGS. 2, 3 and 4 show second, third and fourth example propulsion systems of the invention indicated generally by 200, 300 and 400 respectively. In FIGS. 2, 3 and 4, parts of the propulsion systems 200, 300, 400 which correspond to parts of the propulsion system 100 of FIG. 1 are labelled by reference signs which differ by 100, 200 and 300 respectively from those labelling the corresponding parts in FIG. 1.

The aircraft propulsion system 200 of FIG. 2 comprises two separate turboprop engines 222A, 222B, each including a respective propeller, and each of which may combust hydrocarbon only, hydrogen only or a combination of both hydrocarbon or hydrogen within a combustion arrangement described above in relation to the turbofan engine 122 of the system 100. In variant of the system 200, either or both engines 222A, 222B is substituted by a respective reciprocating engine, each of which includes a respective propeller.

In the aircraft propulsion system 300 of FIG. 3, a first turbofan engine 322A is arranged to combust hydrocarbon only and a second turbofan engine 322B is arranged to combust hydrogen only. To achieve a variation in the ratio of the two fuel types burned at the aircraft level, the thrusts of the turbofan engines 322A, 322B are changed, subject to maintaining the overall thrust provided to the aircraft.

In the aircraft propulsion system 400 of FIG. 4, engine system 420 comprises an internal combustion engine 422A (which may be a turbofan engine or a reciprocating engine including a propeller) fueled by hydrocarbon fuel only, and a fuel cell engine 422B comprising a fuel cell arranged to provide electrical power to an electric motor and a propeller arranged to be driven by the electric motor, the fuel cell being fueled by hydrogen only.

In variants of the aircraft propulsion systems 200, 300, 400 any one or more of the engines 222A, 222B, 322A, 322B, 422A may be any of the following: a turbofan engine; a turboprop engine (including a propeller); a reciprocating engine (including propeller); an arrangement comprising a turboshaft engine arranged to drive an electrical generator and an electrical motor arranged to be driven by the electrical generator and to drive a propeller.

As indicated above, some flight routes or flight missions are more prone than others to non-$CO_2$ climate effects related to high-altitude water vapour and/or contrails. As a result, from the perspective of minimising overall climate impact, optimal fuel loading for some flights will involve more hydrogen and less hydrocarbon, while for others it will involve less hydrogen and more hydrocarbon. However, hydrogen tanks are heavy, and should only be carried if the corresponding hydrogen capacity is required. On the other hand, hydrocarbon tanks are (in most cases) fairly light per unit of fuel energy, so having more hydrocarbon fuel-tank installed capacity than is necessary for the proposed flight does not incur a significant weight penalty.

Figure 5:
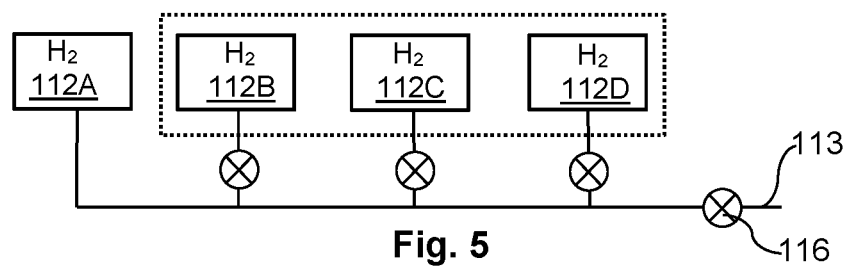
FIG. 5 shows an alternative hydrogen storage arrangement for the aircraft propulsion system of FIG. 1.

An aircraft propulsion system of the invention preferably allows the capacity for stored hydrogen to be adjusted according to the ranges of flight missions which an aircraft comprising the system is required to carry out. For example, the hydrogen storage capacity of a system of the invention may be provided by a plurality of similar or identical removable tanks, allowing the number, and hence total capacity, of the tanks to be adjusted, for example on a flight-by-flight or seasonal basis. FIG. 5 shows an alternative hydrogen storage arrangement for the aircraft propulsion systems 100, 200, 300, 400 of FIGS. 1 to 4, the arrangement comprising a single fixed hydrogen storage tank 112A and adaptable capacity comprising further tanks 112B, 112C, 112D any one or more of which may be detached and removed from the system 100.

We claim:
1. An aircraft propulsion system comprising:
a hydrocarbon fuel store;
a hydrogen fuel store;
an engine system capable of producing thrust by:
　(i) combusting hydrocarbon fuel; and/or
　(ii) combusting or otherwise oxidising hydrogen fuel;
a conveying system arranged to convey hydrocarbon fuel and hydrogen fuel from the fuel stores to the engine system; and
a control system arranged to control the respective flow rates of hydrocarbon fuel and hydrogen fuel within the conveying system;

wherein the control system is arranged to adapt the fractions of the total fuel energy flow rate to the engine system represented by the hydrocarbon fuel energy flow rate and the hydrogen fuel energy flow rate in order to reduce climate warming impact caused by at least one of carbon dioxide, water vapour and condensation trails produced by the aircraft propulsion system and/or to increase climate cooling impact caused by condensation trails produced by the aircraft propulsion system, and wherein the control system is arranged to:
- (i) calculate the flow rate of hydrogen fuel to the engine system necessary to generate a given total output power of the engine system for each of a series of values of the flow rate of hydrocarbon fuel to the engine system and a given set of atmospheric conditions and a given aircraft velocity;
- (ii) for each calculated value of the flow rate of hydrocarbon fuel and a corresponding value of the flow rate of hydrogen fuel to the engine system, calculate a climate impact value for the climate effects of $CO_2$, water vapour and direct condensation trail effects per unit time or per unit flight distance for the given set of atmospheric conditions and the given aircraft velocity;
- (iii) determine the pair of fuel flow rates of hydrocarbon fuel and hydrogen fuel resulting in the lowest climate impact value for the set of atmospheric conditions and aircraft velocity; and
- (iv) control the respective flow rates of hydrocarbon fuel and hydrogen fuel to the engine system to implement the pair of fuel flow rates determined in step (iii).

2. The aircraft propulsion system according to claim 1, wherein the control system is arranged to increase the fraction of the total fuel energy flow rate to the engine system represented by the hydrocarbon fuel energy flow rate and reduce the fraction of the total fuel energy flow rate to the engine system represented by the hydrogen fuel energy flow rate when the aircraft propulsion system enters air having a relative humidity over ice greater than 100%.

3. The aircraft propulsion system according to claim 2, wherein the control system is arranged to increase the fraction of the total fuel energy flow rate to the engine system represented by the hydrocarbon fuel energy flow rate and reduce the fraction of the total fuel energy flow rate to the engine system represented by the hydrogen fuel energy flow rate when the aircraft propulsion system enters air having a relative humidity over ice greater than 120%.

4. The aircraft propulsion system according to claim 1, wherein the control system is arranged to increase the fraction of the total fuel energy flow rate to the engine system represented by the hydrocarbon fuel energy flow rate and decrease the fraction of the total fuel energy flow rate to the engine system represented by the hydrogen fuel energy flow rate when the aircraft propulsion system enters air having a relative humidity over ice greater than 100%.

5. The aircraft propulsion system according to claim 1, wherein the control system is arranged to increase the fraction of the total fuel energy flow rate to the engine system represented by the hydrocarbon fuel energy flow rate and reduce the fraction of the total fuel energy flow rate to the engine system represented by the hydrogen fuel energy flow rate when the aircraft propulsion system enters air having a relative humidity over ice greater than 100% under conditions in which a condensation trail reduces climate warming impact.

6. The aircraft propulsion system according to claim 1, wherein the control system is arranged to vary the fractions of the total fuel energy flow rate to the engine system represented by the hydrocarbon fuel energy flow rate and the hydrogen fuel energy flow rate as a function of one or more of the latitude, longitude and altitude of the aircraft propulsion system.

7. The aircraft propulsion system according to claim 1, wherein the control system is arranged to increase the fraction of the total fuel energy flow rate to the engine system represented by the hydrocarbon fuel energy flow rate and reduce the fraction of the total fuel energy flow rate to the engine system represented by the hydrogen fuel energy flow rate when the altitude of the aircraft propulsion system exceeds a threshold altitude.

8. The aircraft propulsion system according to claim 7, wherein the control system is arranged to increase the fraction of the total fuel energy flow rate to the engine system represented by the hydrocarbon fuel energy flow rate and reduce the fraction of the total fuel energy flow rate to the engine system represented by the hydrogen fuel energy flow rate when the altitude of the aircraft propulsion system exceeds a threshold value such that the fraction of the total fuel energy flow rate to the engine system represented by the hydrocarbon fuel energy flow rate is a monotonically increasing function of the altitude of the aircraft propulsion system.

9. The aircraft propulsion system according to claim 1, wherein the control system is arranged to increase the fraction of the total fuel energy flow rate to the engine system represented by the hydrogen fuel energy flow rate and reduce the fraction of the total fuel energy flow rate to the engine system represented by the hydrocarbon fuel energy flow rate when the aircraft propulsion system enters ice supersaturated air having conditions corresponding to the upper tropical troposphere.

10. The aircraft propulsion system according to claim 9, wherein the control system is arranged to reduce the fraction of the total fuel energy flow rate to the engine system represented by the hydrocarbon fuel energy flow rate to zero when the aircraft propulsion system enters ice-supersaturated air having conditions corresponding to the upper tropical troposphere and a temperature below a threshold temperature.

11. The aircraft propulsion system according to claim 1, wherein the control system is arranged to adjust the fractions of the total fuel energy flow rate to the engine system represented by the hydrocarbon fuel energy flow rate and the hydrogen fuel energy flow rate such that only hydrocarbon fuel is provided to the engine system when the system operates in non-ice supersaturated air having conditions corresponding to the upper tropical troposphere in order to minimise high-altitude water vapour emissions.

12. The aircraft propulsion system according to claim 1, wherein the control system is arranged to calculate climate impact values by steps including calculating the masses of $CO_2$ and water vapour, and the number of soot particles, emitted per unit time or flight distance in dependence upon aircraft forward velocity, the respective flow rates of hydrocarbon fuel and hydrogen fuel to the engine system, the $CO_2$ emission index of the hydrocarbon fuel, the water vapour emission indices of the hydrocarbon fuel and the hydrogen fuel and optionally characteristics of the engine system.

13. The aircraft propulsion system according to claim 12, wherein the control system is arranged to calculate climate impact values by steps including calculating or looking up the climate impact per unit mass of water vapour emitted by the aircraft propulsion system as a function of at least one of the altitude, latitude and longitude of the aircraft propulsion system.

14. The aircraft propulsion system according to claim 12, wherein the control system is arranged to calculate climate impact values by steps including calculating the climate impact per unit time or flight distance of $CO_2$ emitted by the aircraft propulsion system.

15. The aircraft propulsion system according to claim 12, wherein the control system is arranged to calculate climate impact values by steps including calculating the climate impact per unit time or flight distance of a condensation trail corresponding to determined water vapour and soot emissions which correspond to given flow rates of hydrocarbon fuel and hydrogen fuel to the engine system.

16. The aircraft propulsion system according to claim 1, wherein the control system is arranged to carry out steps (i) to (iv) either continuously or for each of a plurality of flight path sections each of which is defined by flight time or flight distance or on the basis of a material change in at least one of the altitude, latitude and longitude of the aircraft propulsion system, ambient static temperature, ambient relative humidity, aircraft Mach number and required total output power of the engine system.

17. The aircraft propulsion system according to claim 1, wherein the hydrogen fuel store comprises a plurality of separate hydrogen fuel stores, one or more of which is selectably removeable from the aircraft propulsion system to allow adaptation of the storage capacity of the hydrogen fuel store.

18. An aircraft comprising the aircraft propulsion system according to claim 1.

19. A method of operating an aircraft propulsion system which comprises:
   a hydrocarbon fuel store;
   a hydrogen fuel store;
   an engine system capable of producing thrust by:
      (i) combusting hydrocarbon fuel; and/or
      (ii) combusting or otherwise oxidising hydrogen fuel; and
   a conveying system arranged to convey hydrocarbon fuel and hydrogen fuel from the fuel stores to the engine system;
the method comprising the steps of:
controlling the respective flow rates of hydrocarbon fuel and hydrogen fuel within the conveying system to adapt the fractions of the total fuel energy flow rate to the engine system represented by the hydrocarbon fuel energy flow rate and the hydrogen fuel energy flow rate in order to reduce climate warming impact caused by at least one of carbon dioxide, water vapour and condensation trails produced by the aircraft propulsion system and/or to increase climate cooling impact caused by condensation trails produced by the aircraft propulsion system;
calculating the flow rate of hydrogen fuel to the engine system necessary to generate a given total output power of the engine system for each of a series of values of the flow rate of hydrocarbon fuel to the engine system and a given set of atmospheric conditions and a given aircraft velocity;
calculating, for each calculated value of the flow rate of hydrocarbon fuel and a corresponding value of the flow rate of hydrogen fuel to the engine system, a climate impact value for the climate effects of $CO_2$, water vapour and direct condensation trail effects per unit time or per unit flight distance for the given set of atmospheric conditions and the given aircraft velocity;
determining the pair of fuel flow rates of hydrocarbon fuel and hydrogen fuel resulting in the lowest climate impact value for the set of atmospheric conditions and aircraft velocity; and
controlling the respective flow rates of hydrocarbon fuel and hydrogen fuel to the engine system to implement the pair of fuel flow rates determined.

* * * * *